(12) United States Patent
Caviedes

(10) Patent No.: US 7,054,497 B2
(45) Date of Patent: May 30, 2006

(54) METHOD AND SYSTEM FOR OPTIMIZING IMAGE SHARPNESS DURING CODING AND IMAGE ENHANCEMENT

(75) Inventor: Jorge Caviedes, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 763 days.

(21) Appl. No.: 10/172,416

(22) Filed: Jun. 14, 2002

(65) Prior Publication Data

US 2003/0231796 A1    Dec. 18, 2003

(51) Int. Cl.
*G06K 9/36*    (2006.01)

(52) U.S. Cl. .................. 382/239; 382/251

(58) Field of Classification Search ........... 382/239, 382/251
See application file for complete search history.

(56) References Cited

U.S. PATENT DOCUMENTS

| 4,734,767 | A | * | 3/1988 | Kaneko et al. | ......... 348/400.1 |
|---|---|---|---|---|---|
| 5,598,484 | A | * | 1/1997 | Suzuki et al. | ............... 382/239 |
| 6,535,647 | B1 | * | 3/2003 | Abousleman | ............... 382/253 |
| 6,539,122 | B1 | * | 3/2003 | Abousleman | ............... 382/240 |
| 6,640,012 | B1 | * | 10/2003 | Shnaider et al. | ............ 382/239 |
| 6,870,962 | B1 | * | 3/2005 | Lee et al. | .................. 382/248 |

FOREIGN PATENT DOCUMENTS

| JP | 11002938 | 1/1999 |
|---|---|---|
| WO | WO0145389 | 6/2001 |

* cited by examiner

*Primary Examiner*—Wenpeng Chen

(57) ABSTRACT

The present invention relates to a method and system for controlling the quality of video data by selecting the optimal quantization parameter during encoding. The system is configured to perform quantization for one or more macroblocks using a different range of step sizes, then the kurtosis for the respective quantized data is performed to determine the macroblock and the corresponding quantization step size that yields the highest kurtosis value. The quantization step size that generates the highest kurtosis value is selected to the blocks of input-video data during encoding.

19 Claims, 4 Drawing Sheets

METHOD AND SYSTEM FOR OPTIMIZING IMAGE SHARPNESS DURING CODING AND IMAGE ENHANCEMENT

BACKGROUND OF THE INVENTION

1. Field of the Invention

The present invention relates to a method and system for enhancing image sharpness and, in particular, to a method and system for optimizing the sharpness quality of pictures during coding and image enhancement processes.

2. Description of the Related Art

It is the ultimate goal of video experts to provide most perceptually appealing video images to viewers. Sharpness is related to the clarity of detail in a video image and strongly depends on the edge definition of an image. The relative sharpness of an image can be measured, in the spatial domain, by the definition of edges in comparison to a reference image, or in the transformed domain, by the difference in high frequency energy associated with edges and fine details, also with respect to the reference. As one skilled in the art can appreciate, the quantization of the DCT coefficients of 8×8 blocks causes loss of content that affects sharpness while introducing blocking artifacts during an MPEG/JPEG encoding process. Although the blocking artifacts can be reduced without losing the edge information, the loss of sharpness resulting from DCT quantization is not recoverable through post-processing.

Accordingly, the present invention proposes a method of calculating the loss of sharpness caused by the quantization, then using this loss criterion to selectively adjust the quantization parameter to preserve the sharpness of the image during the video-coding process.

SUMMARY OF THE INVENTION

The present invention is directed to an apparatus and method for controlling the quality of video sharpness by adding a sharpness criterion to the quantization-parameter selection process so that the resulting image will have a gain in sharpness for the same bitrate budget.

Still another aspect is that the present invention may be realized in a simple, reliable, and inexpensive implementation.

The foregoing and other features and advantages of the invention will be apparent from the following, more detailed description of preferred embodiments as illustrated in the accompanying drawings in which reference characters refer to the same parts throughout the various views. The drawings are not necessarily to scale; instead the emphasis is placed upon illustrating the principles of the invention.

DETAILED DESCRIPTION OF THE EMBODIMENTS

Figure 1:
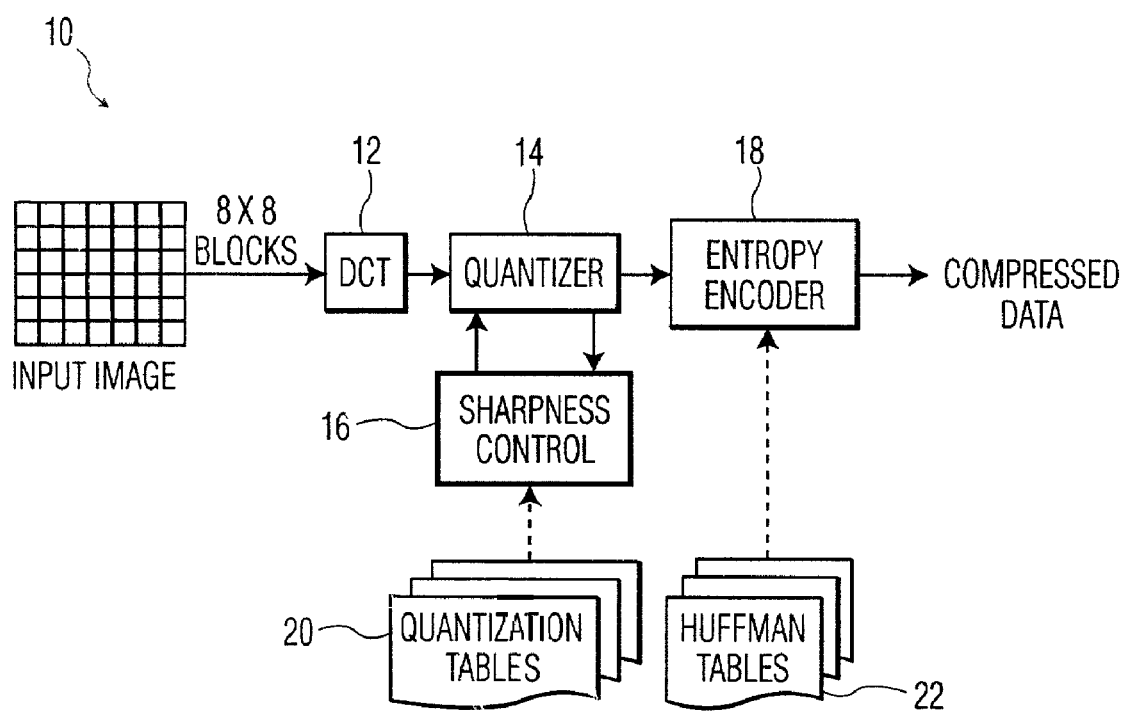
FIG. 1 is a simplified block diagram of an apparatus built according to a first embodiment of the present invention.

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

In order to facilitate an understanding of this invention, background information relating to Moving Pictures Expert Group (MPEG) and H.263 coding is explained. In general, the MPEG-2 and H.263 codings are performed on an image by dividing the image into macro-blocks of 16×16 pixels, each with a separate quantizer-scale value associated therewith. The macroblocks are further divided into individual blocks of 8×8 pixels. Each 8×8 pixel block is subjected to a discrete cosine transform (DCT) to generate DCT coefficients for each of the 64 frequency bands therein. The DCT coefficients in an 8×8 pixel block are then divided by a corresponding coding parameter, i.e., a quantization weight. The quantization weights for a given 8×8 pixel block are expressed in terms of an 8×8 quantization matrix. Thereafter, additional calculations are affected on the DCT coefficients to take into account, namely, the quantizer scale value, among other things, and thereby complete the MPEG-2 and H.263 codings. It should be noted that other coding techniques, such as JPEG or the like, can be used in the present invention.

There are three types of frames of video information which are defined by the MPEG standard, intra-frames (I frame), forward-predicted frames (P frame) and bidirectional-predicted frames (B frame). The I frame, or an actual video-reference frame, is periodically coded, i.e., one reference frame for each of the fifteen frames. A prediction is made of the composition of a video frame, the P frame, to be located a specific number of frames forward and before the next reference frame. The B frame is predicted between the I frame and P frames, or by interpolating (averaging) a macroblock in the past reference frame with a macroblock in the future reference frame. The motion vector is also encoded which specifies the relative position of a macroblock within a reference frame with respect to the macroblock within the current frame.

As a person with average skills in this art would appreciate, a fundamental task in many statistical analyses is to characterize the location and variability of a data set. The characterization of the data can be represented with skewness and kurtosis. Skewness is a measure of symmetry, and a data set, or distribution, is considered symmetrical if it looks the same to the left and right of the center point. Kurtosis is a measure of whether the data are peaked or flat relative to a normal distribution. Data sets with high kurtosis tend to have a distinct peak near the mean, then decline rapidly, and have heavy tails. Data sets with low kurtosis tend to have a flat top near the mean rather than a sharp peak. Normally, kurtosis has been used to calculate sharpness, for example, in scanning electron-microscope imaging. However, kurtosis of the spatial frequency distribution of the FFT or the DCT has not been applied to coded images and video. Accordingly, a key principle of the present invention relies on the realization that kurtosis and skewness are highly correlated with the loss of sharpness caused by coding.

Now, a detailed description will be made in detail in regards to the present invention with reference to drawings.

It is to be understood at the outset of the description which follows that a detailed description of the function and encoding techniques of a conventional encoder that are well-known to those skilled in this art is omitted herein for the sake of clarity and simplicity.

FIG. 1 is a simplified block diagram of the sharpness controller 10 according to a first embodiment of the present invention. In particular, the embodiment shown in FIG. 1 is applicable during the JPEG coding of still images. As shown in FIG. 1, the sharpness controller 10 includes a DCT module 12, a quantization module 14, a sharpness control module 16, and an entropy encoder 18 for optimizing image sharpness during encoding. It should be noted that the sharpness controller 10 may represent, i.e., a microprocessor, a central processing unit, a computer, a circuit card or an application-specific integrated circuit (ASICs) and may also include a digital signal processor.

In operation, the digital image data, after being converted from analog-video data, is forwarded to the sharpness controller 10. The input-digital-image data is converted into a group of 8×8 pixel blocks, then the DCT module 12 subjects each 8×8 block to DCT processing in order to generate DCT coefficients for each of the 64 frequency bands therein. As one skilled in the art can appreciate, the DCT coding is operative to encode coefficients as an amplitude of a specific cosine-basis function. In normal operation, the quantizier 14, under the control of the sharpness control module 16, divides the DCT coefficients in an 8×8 pixel block by a specific quantization parameter selected by the sharpness control module 16. As one skilled in this art would appreciate, the quantization process involves deliberate discarding of some frequency data considered to be redundant or of little importance to adequate perception of the image.

The sharpness control module 16 is in charge of selecting the DCT quantization parameter, i.e., quantization step size, during quantization. The quantization table 20 includes a range of quantization step sizes, such that the sharpness control module 16 can perform the quantization for a given macroblock using different quantization step sizes. After obtaining the quantized DCT coefficients using different quantization step sizes, the 2-D kurtosis for the respective quantized DCT coefficients is performed. Note that the 2-D kurtosis is a sharpness indicator for the entire m×n image, or any region within. Then, the quantization step size that yields the highest kurtosis value among one of the blocks of input-digital-image data is selected by the sharpness control module 16 to quantize an output signal from the DCT module 12 during normal operation. Thereafter, the quantized data output by the quantizer 14 using the quantization step size that is selected by the sharpness control module 16 are forwarded to the entropy coder 18. As a person with average skills in this art would appreciate, the quantized DCT coefficient values are each coded using a variable length code, such as a Huffman code, in order to minimize the data rate. Code words and corresponding code lengths are included in the form of code-length look up tables in the Huffman table 22. Finally, the entropy coder 18 compresses the input-quantized DCT coefficient values and supplies the compressed data, thereby completing the coding.

Figure 2:
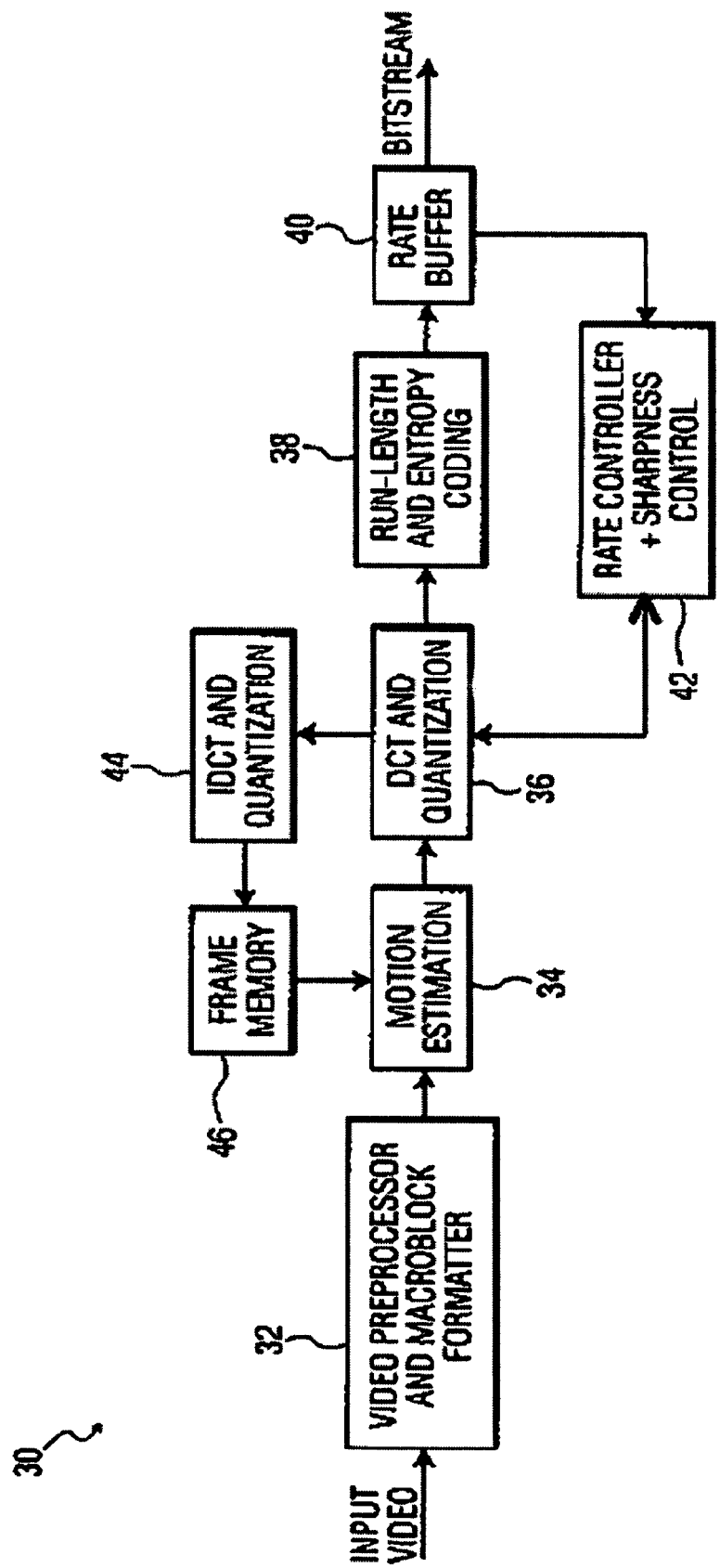
FIG. 2 is a simplified block diagram of an apparatus built according to a second embodiment of the present invention.

FIG. 2 is a functional block diagram of the sharpness controller 30 according to a second embodiment of the present invention. In particular, the embodiment shown in FIG. 2 is applicable in block-based video compression, such as MPEG and the H.26x ITU family, which contain motion sequences. The MPEG standard is defined in International Standard ISO/IEC 11172-1, "Information Technology—Coding of moving pictures and associated audio-for-digital storage media at up to approximately 1.5 Mbit/s", Parts 1, 2 and 3, First edition Feb. 1, 1993 which is hereby incorporated by reference in its entirety. Further, it should be noted that the sharpness controller 30 may represent, i.e., a microprocessor, a central processing unit, a computer, a circuit card or an application-specific integrated circuit (ASICs) and may also include a digital signal processor.

As shown in FIG. 2, an incoming video stream containing image-picture data passes through the video preprocessor 32 and is converted into a group of 8×8 pixel blocks. The output of the video preprocessor 32 is inputted to motion estimation 34 which compares the past pictures to the present picture data in order to generate motion vectors for temporal compression of the picture data in the video stream. As a person with average skills in this art would appreciate, the past pictures are stored in the frame memory 46 and obtained by providing the quantized data to the IDCT and quantization module 44 to undergo the inverse DCT operation and dequantization to decompress the pixel values. The output of the motion estimation 34 is forwarded to the DCT and quantization module 36, which transforms each 8×8 block into DCT processing to generate DCT coefficients for each of the 64 frequency bands therein. At the same time, a quantizer in DCT and quantization module 36 divides the DCT coefficients in an 8×8 pixel block by a specific quantizing step size selected by the sharpness control module 42. Note that the quantization error (the difference between quantized and non-quantized DCT coefficients) depends on the quantization matrix, and the quantizer scale (called MQANT). As the quantization matrix is largely constant, the decisions regarding quantization parameters are made on the basis of four 8×8 blocks, taking into account the complexity of the macroblock based on the status of the buffer 40 in constant bitrate applications. It should be noted that a limited number of four 8×8 pixel blocks are processed at a time according to the standard set forth in the MPEG standard. However, it is to be understood that the number of macroblocks in the specification should not impose limitations on the scope of the invention.

The selection of the quantization step size is performed in the following manner. First, the sharpness control module 42 performs the quantization for each given four macroblocks using a different range of step sizes, then the kurtosis for the respective quantized DCT coefficients is performed. Then, the quantization step size that yields the highest kurtosis value among one of four marcroblock is selected by the sharpness control module 42 to quantize an output signal from the motion estimation 34.

After obtaining the quantization step size, the output of the motion estimation 34 is quantized using the quantization step size selected by the sharpness control module 42. The quantized DCT coefficient values outputted by the DCT and quantization module 36 are forwarded to the run-length encoder 38. Finally, the run-length encoder 38 receives the output of the DCT and quantizer 36 in order to generate the compressed data packets for a picture which are then stored in buffer 40 for output as a coded video stream. The motion vector is also encoded which specifies the relative position of a macroblock within a reference frame with respect to the macroblock within the current frame.

Figure 3:
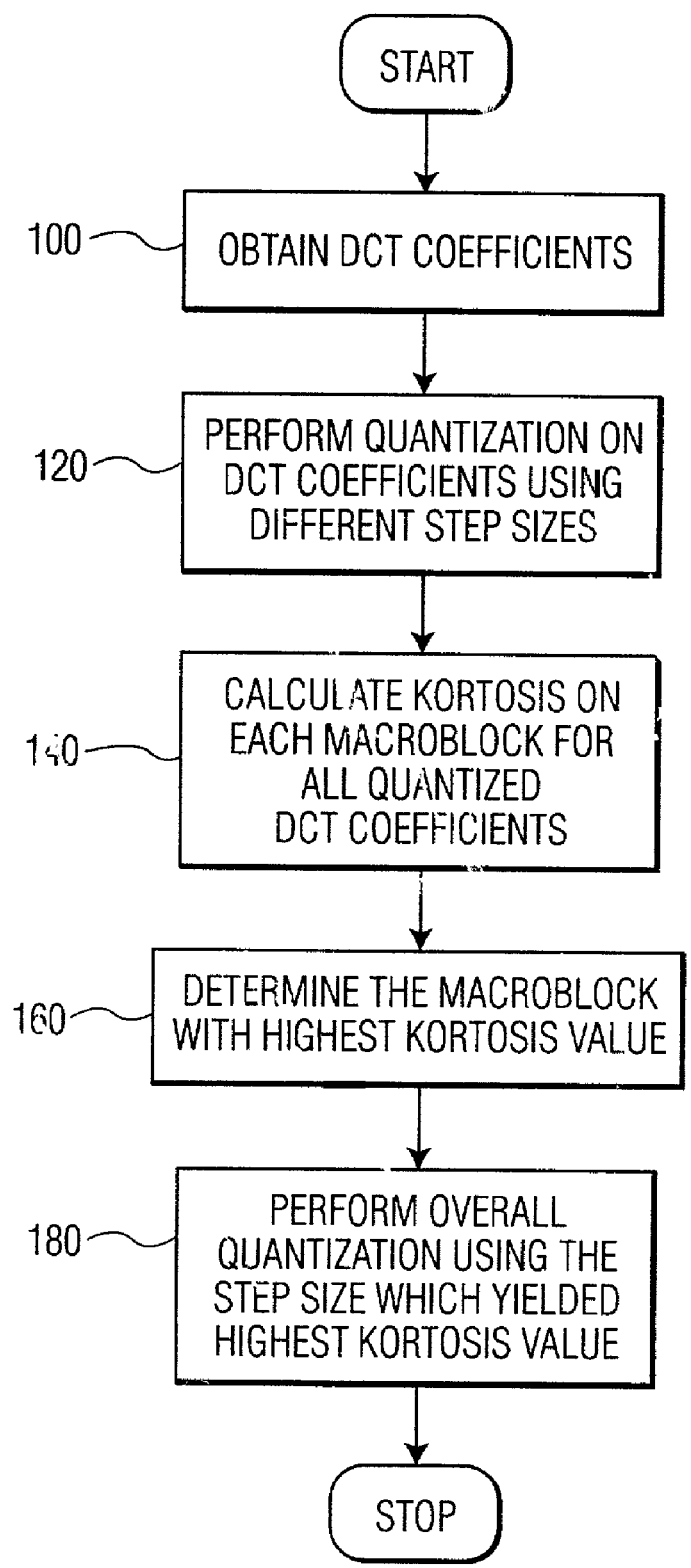
FIG. 3 is a flow chart illustrating the operation steps of controlling the sharpness of the video quality in accordance with the present invention; and, FIG. 4 is a simplified block diagram of an apparatus built according to a third embodiment of the present invention.

FIG. 3 is a flow diagram depicting the operation steps of selecting the DCT quantization parameters during the quantization process in accordance with the first and second embodiments of the present invention. Note that the flow diagrams illustrate the functional information that a person of ordinary skill in the art requires to fabricate circuits or to generate computer software to perform the processing required of the particular apparatus.

An 8×8 block of incoming video data is subject to a DCT operation to obtain DCT coefficients for each of the 64 frequency bands therein in step 100. The DCT coefficients are then quantized using different step sizes in step 120 to discard frequency data that are redundant or of little importance to adequate perception of the image. Thereafter, the 2-D kurtosis calculation is performed on each macroblock for all quantized DCT coefficients in step 140. In step 160, the macroblock with the highest kurtosis value is determined. Then, the quantization of the overall picture is performed using the step size that yielded the highest kurtosis value in step 180.

Figure 4:
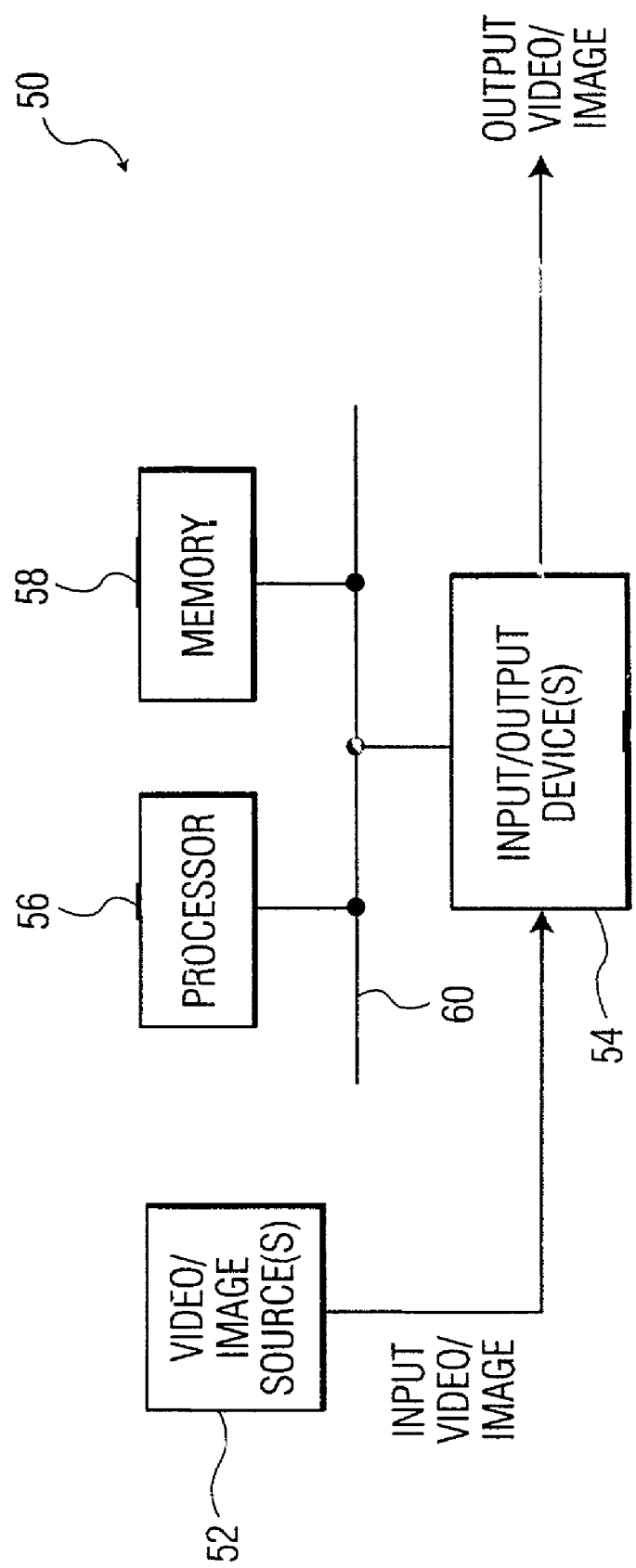

FIG. 4 illustrates a video/image processing system 50 according to a third embodiment of the present invention. By way of example, the system 50 may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. As shown in FIG. 3, the system 50 includes one or more video/image sources 52, one or more input/output devices 54, a processor 56, and a memory 58. The video/image source(s) 52 may represent, i.e., a television receiver, a VCR or other video/image storage device. The input/output devices 54, processor 56, and memory 58 may communicate over a communication medium 60, which may represent, i.e., a bus, a communication network, one or more internal connections of a circuit, circuit card or other device, as well as portions and combinations of these and other communication media. The program memory 58 may represent, i.e., disk-based optical or magnetic storage units, electronic memories, as well as portions or combinations of these and other memory devices.

Various functional operations associated with the sharpness controller 10 and 30, as explained before, may be implemented in whole or in part in one or more software programs/signal processing routines stored in the memory 58 and executed by the processor 56. In other embodiments, however, hardware circuitry may be used in place of, or in combination with, software instructions to implement the invention.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method for controlling the sharpness quality of video data, the method comprising the steps of:
    (a) converting input-video data into blocks;
    (b) performing a discrete cosine transform (DCT) on the blocks of said input-video data to produce blocks of DCT coefficients; (c) selecting a quantization parameter providing a highest kurtosis output to one of the blocks of said DCT coefficients; and,
    (d) quantizing the blocks of said DCT coefficients using said selected quantization parameter to produce quantized data.

2. The method of claim 1, further comprising the steps of encoding said qunatized data into a predetermined, standard compliant packet, and transmitting said standard compliant packet.

3. The method of claim 2, wherein the step of encoding is performed using a Huffman code.

4. The method of claim 1, wherein the step of (c) selecting said quantization parameter comprises the steps of:
    quantizing the blocks of said DCT coefficients using a predetermined range of step sizes and determining the kurtosis thereof; and,
    determining one of the blocks of said DCT coefficients and the corresponding step size that yields the highest kurtosis output.

5. The method of claim 1, wherein said input video data is one of JPEG and MPEG signals.

6. An apparatus for controlling the sharpness quality of input-video data, comprising:
    means for converting said input-video data into blocks;
    means for transforming the blocks of said input video into blocks of DCT coefficients,
    a quantizer adaptively quantizing an output from said transforming means using a quantization parameter to produce quantized data; and,
    a sharpness controller coupled to said quantizer for selecting said quantization parameter based on quantizing the blocks of said DCT coefficients using a predetermined range of step sizes and calculating kurtosis thereof, and selecting one of said step sizes that yields a highest kurtosis as said quantization parameter.

7. The apparatus of claim 6, further comprising an encoder for encoding said qunatized data into a predetermined, standard compliant packet.

8. The apparatus of claim 6, wherein said kurtosis indicates a sharpness quality of the blocks of said input-video data.

9. The apparatus of claim 6, wherein said input-video data is one of JPEG and MPEG signals.

10. A method for controlling the sharpness quality of video data, the method comprising the steps of:
    (a) converting input-video data into blocks;
    (b) performing motion-estimation analysis on the blocks of said input-video data to generate a reference signal;
    (c) performing a discrete cosine transform (DCT) on the blocks of said input-video data to produce blocks of DCT coefficients;
    (d) selecting a quantization parameter providing a highest kurtosis output to one of the blocks of said DCT coefficients; and,
    (e) quantizing the blocks of said DCT coefficients using said selected quantization parameter to produce quantized data.
    (f) encoding said quantized data and said reference signal into a predetermined, standard compliant packet, and transmitting said standard compliant packet.

11. The method of claim 10, further comprising the step of storing said standard compliant packet for subsequent transmission.

12. The method of claim 10, further comprising the steps of inverse quantizing and transforming said quantized data into decompressed data, and storing said decompressed data for subsequent generation of said reference signal.

13. The method of claim 10, wherein the step of (d) selecting said quantization parameter comprises the steps of:

quantizing the blocks of said DCT coefficients using a predetermined range of step sizes and determining the kurtosis thereof; and, determining a block and the corresponding step size that yields the highest kurtosis output.

14. The method of claim 10, wherein said input-video data is one of JPEG and MPEG signals.

15. An apparatus for controlling the sharpness quality of input-video data, comprising:

means for converting said input-video data into blocks;

means for performing motion-estimation analysis on the blocks of said input-video data to generate a reference signal;

means for transforming the blocks of said input video into blocks of DCT coefficients and quantizing the blocks of said DCT coefficients using a quantization parameter to produce quantized data;

a sharpness controller coupled to said transforming means for selecting said quantization parameter based on quantizing the blocks of said DCT coefficients using a predetermined range of step sizes and calculating kurtosis thereof, and selecting one of said step sizes that yields a highest kurtosis as said quantization parameter; and, an encoder configured to receive and encode said quantized data and said reference signal into a predetermined, standard compliant packet.

16. The apparatus of claim 15, wherein said kurtosis indicates a sharpness quality of the blocks of said input-video data.

17. The apparatus of claim 15, wherein said input-video data is one of JPEG and MPEG signals.

18. The apparatus of claim 15, further comprising a buffer configured to receive an output of said encoder for storing said standard compliant packet for subsequent transmission.

19. The apparatus of claim 15, further comprising:

an inverse converter coupled to receive the output of said transforming means to operatively inverse-quantize and transform said quantized data into decompressed data; and, a memory for storing said decompressed data for subsequent generation of said reference signal.

* * * * *